United States Patent
Skertic et al.

(10) Patent No.: US 11,290,301 B2
(45) Date of Patent: Mar. 29, 2022

(54) SECURE ENGINE COMMUNICATION

(71) Applicants: Rolls-Royce North American Technologies Inc., Indianapolis, IN (US); Rolls-Royce Corporation, Indianapolis, IN (US)

(72) Inventors: Richard J. Skertic, Carmel, IN (US); John J. Costello, Indianapolis, IN (US); Robert T. Duge, Carmel, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 16/687,874

(22) Filed: Nov. 19, 2019

(65) Prior Publication Data

US 2020/0204374 A1 Jun. 25, 2020

Related U.S. Application Data

(60) Provisional application No. 62/785,601, filed on Dec. 27, 2018, provisional application No. 62/782,984,
(Continued)

(51) Int. Cl.
*H04L 9/32* (2006.01)
*H04L 12/437* (2006.01)
(Continued)

(52) U.S. Cl.
CPC ............ *H04L 12/437* (2013.01); *B64D 31/06* (2013.01); *F02C 7/26* (2013.01); *G05B 19/0425* (2013.01);
(Continued)

(58) Field of Classification Search
None
See application file for complete search history.

(56) References Cited

U.S. PATENT DOCUMENTS 9,002,018 B2    4/2015   Wilkins
9,021,255 B1 *   4/2015   Aharoni ............... H04L 9/3268
                                                                     713/156

(Continued)

FOREIGN PATENT DOCUMENTS

WO   WO-2016043962 A1 *   3/2016 ........... G06F 3/0637

OTHER PUBLICATIONS

Extended European Search Report, issued in EP Application 19216628.8, dated Mar. 6, 2020, pp. 1-10, European Patent Office, Munich, Germany.
(Continued)

*Primary Examiner* — Jeffrey C Pwu
*Assistant Examiner* — Mayasa A. Shaawat
(74) *Attorney, Agent, or Firm* — Crowell & Moring LLP

(57) ABSTRACT

A method of communication, within a processing system of a gas turbine engine, between a first electronic component and a second electronic component, comprising: generating by the first electronic component, a request, comprising a digital certificate, intern comprising a first host public key and a first client public key, signed with a first host private key, to initiate a trusted communication session with a second electronic component; encrypting at the first electronic component, at least a portion of the request with a first client private key; transmitting the request to the second electronic component; the first host private key and the first host public key defining a first asymmetric keypair and the first client private key and the first client public key defining a second asymmetric keypair.

21 Claims, 6 Drawing Sheets

Related U.S. Application Data filed on Dec. 20, 2018, provisional application No. 62/783,017, filed on Dec. 20, 2018.

(51) Int. Cl.

| | | |
|---|---|---|
| *H04L 9/06* | (2006.01) | |
| *G05B 19/042* | (2006.01) | |
| *H04L 9/00* | (2022.01) | |
| *G06F 16/23* | (2019.01) | |
| *B64D 31/06* | (2006.01) | |
| *F02C 7/26* | (2006.01) | |
| *G06F 16/182* | (2019.01) | |
| *G06F 12/1018* | (2016.01) | |
| *G06F 21/12* | (2013.01) | |
| *G06F 21/57* | (2013.01) | |
| *H04L 9/08* | (2006.01) | |
| *H04L 29/06* | (2006.01) | |

(52) U.S. Cl.
CPC ........ *G06F 12/1018* (2013.01); *G06F 16/182* (2019.01); *G06F 16/2379* (2019.01); *G06F 21/125* (2013.01); *G06F 21/575* (2013.01); *H04L 9/006* (2013.01); *H04L 9/0618* (2013.01); *H04L 9/0637* (2013.01); *H04L 9/0643* (2013.01); *H04L 9/0825* (2013.01); *H04L 9/3242* (2013.01); *H04L 9/3263* (2013.01); *H04L 63/0435* (2013.01); *H04L 63/062* (2013.01); *H04L 63/0823* (2013.01); *H04L 63/123* (2013.01); *H04L 2209/38* (2013.01); *H04L 2463/062* (2013.01)

(56) References Cited

U.S. PATENT DOCUMENTS

| | | | |
|---|---|---|---|
| 9,654,455 | B2 | 5/2017 | Matsuo |
| 9,794,247 | B2* | 10/2017 | Newton ............. G03G 21/1878 |
| 9,960,923 | B2 | 5/2018 | Zombik |
| 2009/0097661 | A1 | 4/2009 | Orsini |
| 2009/0254750 | A1* | 10/2009 | Bono .................... H04L 9/0822 |
| | | | 713/170 |
| 2012/0204032 | A1 | 8/2012 | Wilkins |
| 2014/0208390 | A1 | 7/2014 | Brown et al. |
| 2015/0377669 | A1* | 12/2015 | DeSilva .................... F02C 3/04 |
| | | | 73/112.01 |
| 2018/0012433 | A1* | 1/2018 | Ricci ......................... B60R 1/00 |
| 2020/0189904 | A1* | 6/2020 | Fieglein .................. G07F 9/023 |

OTHER PUBLICATIONS

Daniel Zelle et al., "On Using TLS to Secure In-Vehicle Networks," ARES '17: Proceedings of the 12$^{th}$ International Conference on Availability, Reliability, and Security, Article No. 67, dated Aug. 29, 2017, pp. 1-10, published by Association for Computing Machinery, Reggio Calabria, Italy, https://doi.org/10.1145/3098954.3105824.

Kevin Benton et al., "Timing Analysis of SSL/TLS Man in the Middle Attacks," dated Aug. 16, 2013, pp. 1-9, published online by Cornell University at URL https://arxiv.org/abs/1308.3559.

E. Rescorla, "The Transport Layer Security (TLS) Protocol Version 1.3," Internet Draft, dated Nov. 29, 2017, pp. 1-150, published by RTFM, Inc. at URL https://tools.ietf.org/html/draft-rescorla-tls-dtls13-01.

Jiangyi Hu, "Trust Management in Mobile Wireless Networks: Security and Survivability," Electronic Thesis, Treatises, and Dissertations, dated Mar. 29, 2007, pp. 1-152, published by The Florida State University, Tallahassee, Florida.

* cited by examiner

SECURE ENGINE COMMUNICATION

CROSS-REFERENCE TO RELATED APPLICATIONS

The present application is a non-provisional application of, and claims priority to, U.S. Provisional Application No. 62/782,984, filed Dec. 20, 2018, title: SECURE ENGINE COMMUNICATION. The present application also claims priority to U.S. Provisional Application No. 62/785,601, filed Dec. 27, 2018, title: A METHOD AND PROCESS FOR BLOCKCHAIN IMPLEMENTATION WITH THIRD PARTY DEVICES and U.S. Provisional Application No. 62/783,017, filed Dec. 20, 2018, title: BLOCKCHAIN BASED VEHICLE CONTROL. The present application is also related to co-pending U.S. application Ser. No. 16/283,644, filed Feb. 22, 2019, title: A METHOD AND PROCESS FOR SECURING AN EXECUTABLE IMAGE. The entireties of each of these applications are incorporated herein by reference.

BACKGROUND

The present application relates to encrypting and authenticating electronic messages in a machine such as a gas turbine engine for an aircraft.

Machine control depends on digital communication between electronic devices such as sensors (e.g., cockpit flight controls, temperature sensors), actuators (e.g., motors for adjusting flaps, valves for governing fuel flow). Third parties (e.g., hackers, counterfeiters) may introduce forged electronic devices into the supply chain containing miscalibrated components and malicious software.

The current state of the art for civil and defense aerospace embedded systems follow the standard TRL and MCRL development cycles. These readiness levels are a method of establishing technology maturity for a critical future technology. This process allows the vendor to use an industry accepted criterion to prove their component can meet aerospace standards with the design and manufacturing maturity to be placed on an aerospace engine/platform system. Technology Readiness Levels (TRL) are a measurement system used to assess the maturity level of a particular technology. Each technology project is evaluated against the parameters for each technology level and is then assigned a TRL rating based on its development cycle and progress. There are nine technology readiness levels. TRL 1 is the lowest and TRL 9 is the highest level indicating the technology is ready for production. MCRL levels are similar and not discussed here for brevity In addition to the TRL and MCRL readiness, there are now mandatory federal regulations and requirements for engine control systems to incorporate cybersecurity for the engine/platform and its interconnections to the airframe systems.

As a consequence, it is now logical to Such sensors and actuators and processing nodes are considered "smart" since they have the ability to evaluate the sensed value or drive an actuator to provide a digital output. Smart sensors and actuators are transducer devices that are combined with a processing unit and a communication interface to increase the ability to cope with complexity and increased capability as shown in FIG. 2. Another variant of the smart node is the data concentrator to process the analog to digital conversion, signal processing, encryption, communications, etc. . . .

SUMMARY

Among other things, the present application discloses techniques by which vendors can integrate products (e.g., a smart sensor, a smart transducer, a central control module) onto the engine/platform, while maintaining cyber security. According to some embodiments, digital certificates are used to validate parts that are designed, developed, qualified, and certified for a manufacturer's engines. According to these embodiments, the vendor can be required to obtain a digital certificate from a certification authority, such as an engine manufacturer, for the vendor's devices (e.g., smart sensors, smart transducers, central control modules) to be capable of communication within an engine processing system.

The present application discloses techniques for secure communication within a gas turbine. In some embodiments, a server may issue a digital certificate to an electronic device such as a smart sensor or smart actuator. The digital certificate may include a cryptographic signature of the server confirming authenticity of the electronic device. The electronic device may present the digital certificate when beginning a secure communication session with another component. The other component may authenticate the electronic device based on the signed digital certificate.

According to some embodiments, an engine manufacturer may issue digital certificates to part suppliers. Each part may receive a unique digital certificate based on its serial number. After being installed in the engine, the part may begin a digital communication session with a central controller during which the part presents its digital certificate. If the central controller determines that the digital certificate is valid, then the engine manufacturer may be confident that the installed part is genuine.

Also presented, is a method of communicating between a first electronic component and a second electronic component, within a processing system of a gas turbine engine, the method may include: generating by the first electronic component, a request to initiate a trusted communication session with a second electronic component, the request comprising a digital certificate signed with a first host private key, the digital certificate comprising a first host public key and a first client public key; encrypting at the first electronic component, at least a portion of the request with a first client private key; transmitting the request to the second electronic component; the first host private key and the first host public key may define a first asymmetric keypair and the first client private key and the first client public key may define a second asymmetric keypair.

In some embodiments, the portion of the request encrypted with the first client private key may include a hash of at least the first client public key. In some embodiments the hash is of at least the first client public key and the digital certificate. In some embodiments the trusted communication session is a symmetric key encrypted digital communication session. Ins some embodiments the method may further include: establishing at the second electronic component, the trusted communication session with the first electronic component based on authenticating the first electronic component by: determining that the digital certificate is valid; determining that a latency associated with the first electronic component is less than a predetermined value. In some embodiments The method may further include: generating at the second electronic component, a symmetric key for the trusted communication session; encrypting at the second electronic component, the symmetric key with the client public key; transmitting the encrypted symmetric key to the first electronic component. In some embodiments, the method further includes controlling by the second electronic component, a fuel valve based on metrics reported by the first electronic component during the trusted communication session. In some embodiments, the method may further include assigning at the second electronic component, a privilege level to the first electronic component based on the first host public key. In some embodiments the method may further include: determining at the second electronic component, whether the digital certificate is authentic by decrypting data within the digital certificate with the first host public key; assigning at the second electronic component, a privilege level to the first electronic component based on the digital certificate; and rejecting at the second electronic component, data sent from the first electronic component based on the privilege level during the trusted communication session. In some embodiments the first electronic component may be a smart sensor comprising a transducer.

Also presented is a processing system for controlling a gas turbine engine, the processing system may include a first electronic component, the first electronic component being configured to: generate a request to initiate a trusted communication session with a second electronic component, the request comprising a digital certificate signed with a first host private key, the digital certificate comprising a first host public key and a first client public key; encrypt at least a portion of the request with a first client private key; transmit the request to the second electronic component; wherein the first host private key and the first host public key define a first asymmetric keypair and the first client private key and the first client public key define a second asymmetric keypair.

In some embodiments, the portion of the request encrypted with the first client private key comprises a hash of at least the first client public key. In some embodiments the hash is of at least the first client public key and the digital certificate. In some embodiments the trusted communication session is a symmetric key encrypted digital communication session. In some embodiments The processing system may further comprising a second electronic component, which is configured to: begin the trusted communication session with the first electronic component based on an authentication of the first electronic component by: determining that the digital certificate is valid; determining that a latency associated with the first electronic component is less than a predetermined value. In some embodiments, the second electronic component is further configured to: generate a symmetric key for the trusted communication session; encrypt the symmetric key with the first client public key; transmit the encrypted symmetric key to the first electronic component. In some embodiments the second electronic component is further configured to control a fuel valve based on metrics reported by the first electronic component during the trusted communication session. In some embodiments the second electronic component is further configured to assign a privilege level to the first electronic component based on the first host public key. In some embodiments, the processing system may further include a second electronic component, which is configured to: determine whether the digital certificate is authentic by decrypting data within the digital certificate with the first host public key; assign a privilege level to the first electronic component based on the digital certificate; and during the trusted communication session, reject data sent from the first electronic component based on the privilege level.

Also presented is a method of authenticating data originating from a component supplied by a vendor and received by an engine control module in a gas turbine engine, comprising; generating operational data in the component, the data indicative of a characteristic associated with the operation of the gas turbine; encrypting the operational data and a hash with a private key associated with the vendor to create an encrypted message; transmitting the encrypted message to the engine control module; receiving the encrypted message at the engine control module; decrypting the encrypted message, at the engine control module, with a public key associated with the vendor to obtain a decrypted hash; ensuring the decrypted hash matches a stored hash in the engine control module to thereby authenticate the operational data; the public key and private key may be an asymmetric key pair and the component is a sensor or actuator located on the gas turbine engine.

In some embodiments, the method may further comprising: generating the asymmetric key pair at a certification authority, and supplying, by the certification authority, the private key to the vendor and the public key to the engine control module.

BRIEF DESCRIPTION OF DRAWINGS

The present Specification may be read in conjunction with the appended Figures. The Figures show some of the illustrative embodiments discussed in the Specification. As further stated below, the claimed inventions are not limited to the illustrative embodiments. For clarity and ease of reading, Figures may omit views of certain features.

DETAILED DESCRIPTION

Figure 1A:
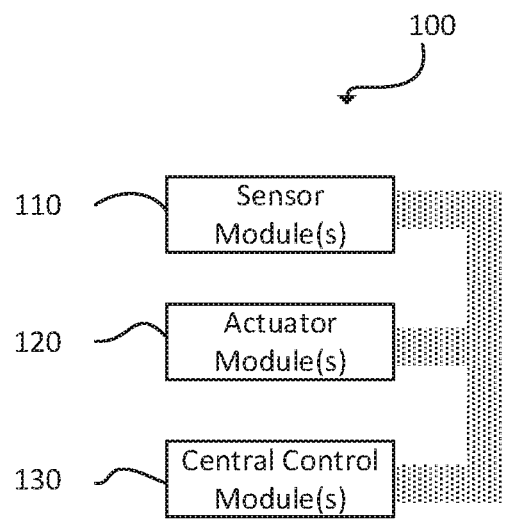
FIG. 1A is a block diagram of an exemplary processing system.

FIG. 1A is a block diagram of a processing system ("PS") 100. Processing system 100 may be configured to control a vehicle engine such as a gas turbine (e.g., a turbofan) including a fan, a compressor, a combustor, and a turbine. Although discussed in the context of a gas turbine engine, processing system 100 may be for control of any machine or assembly. Processing system 100 may be defined by one or more general purpose computers for communication over a network (e.g., the Internet).

As shown in FIG. 1A, processing system 100 may be defined by a network of modules including one or more smart sensors 110 (also called sensor packages) and one or more smart actuators 120 (also called actuator packages). As discussed below, smart sensors 110 may be for converting variations in a physical metric (e.g., temperature) into a digital signal. Smart actuators 120 may be for producing variations in a physical metric (e.g., rotational speed) in response to a digital signal. Processing system 100 may be distributed. For example, some elements of processing system 100 may be disposed inside an aircraft body while other elements of processing system 100 may be disposed in a turbofan engine.

In addition to sensor and transducer packages 110, 120, processing system 100 may include one or more central control modules 130. Central control modules 130 may be for analyzing data provided by smart sensors 110 and issuing commands to smart actuators 120 based thereon. Central control module 130 may be a general purpose computer. Central control module 130 may be any electronic component of a general purpose computer.

Figure 1B:
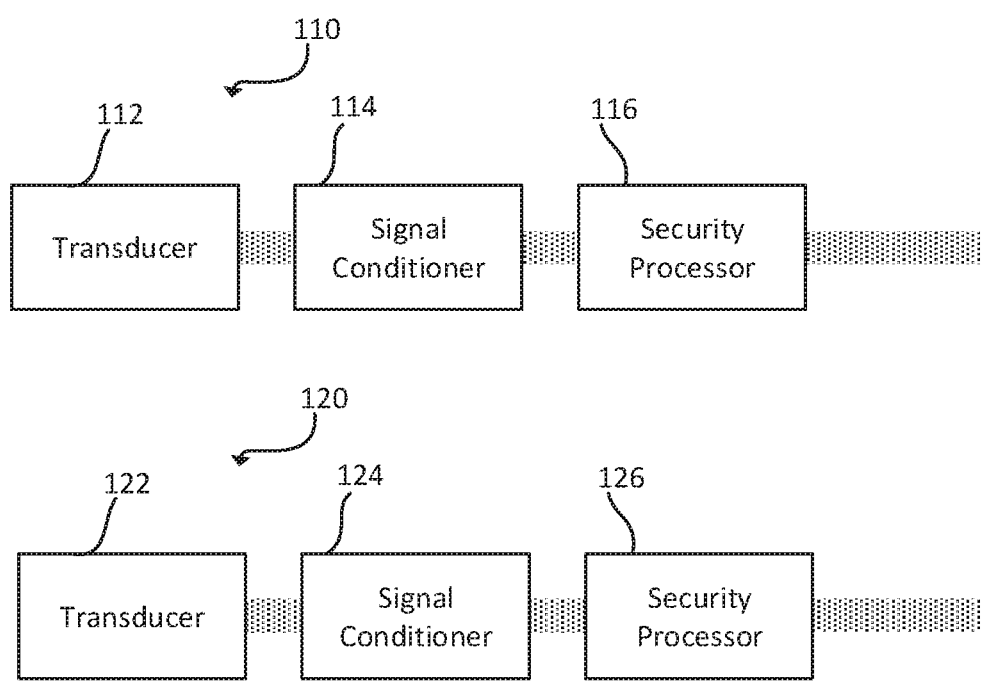
FIG. 1B is a block diagram of two exemplary smart packages for the processing system.

As shown in FIG. 1B, a smart sensor 110 may include a sensor transducer 112, a signal conditioner 114, and a security processor 116. Sensor transducer 112 may be configured to convert variations in a physical metric (e.g., temperature, rotational speed, displacement) into a digital or analog electric signal. Signal conditioner 114 may include a processor configured to convert the digital or analog electric signal originating from transducer 112 into a digital signal recognizable by other components. For example, signal conditioner 114 may convert analog variations in voltage from transducer 112 into a sequence of digital signals.

Security processor 116 may be configured to package digital signals from conditioner 114 into an electronic packet suitable for transmission over a network. Security processor 116 may create a series of digital messages (e.g., data packets). The digital messages may include the digital signals from conditioner 114, metadata (e.g., a sensor ID), and various levels of encryption (discussed below).

A smart actuator 120 may include an actuator transducer 122, a signal conditioner 124, and a security processor 126. Actuator transducer 122 may be configured to convert variations in an electric signal into a physical action. Actuator transducer 122 may be, for example, a solenoid for controlling a fuel valve, an inverter for driving a pump, etc. Signal conditioner 124 may be configured to convert a digital signal passing from security processor 126 into a digital or analog signal to which actuator transducer 122 is responsive.

Security processor 126 may be configured to unpack data packets transmitted over a network. Security processor 126 may, for example, decrypt a message, respond to appended metadata, etc. Security processor 126 may convert a message into a signal to which signal conditioner 124 is responsive. For example, security processor 126 can strip security and encryption layers from a message, then forward the remaining digital content to signal conditioner 124, which can convert the digital content into an analog signal.

Figure 2A:
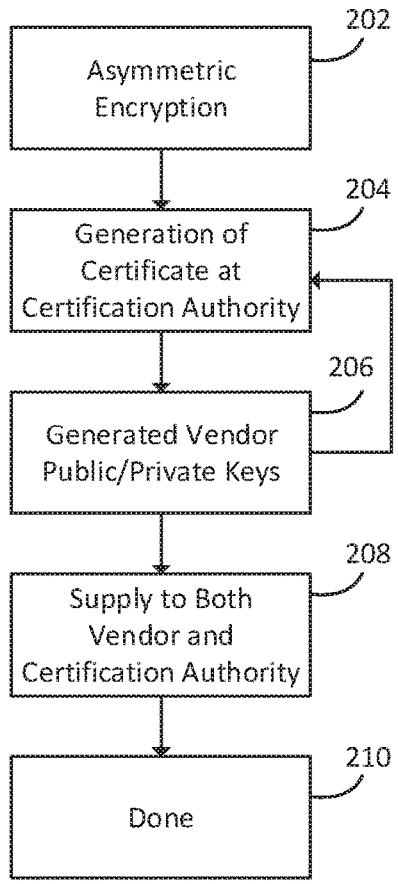
FIG. 2A is an exemplary method of issuing a digital certificate from a certificate authority to a vendor.

FIG. 2A presents a method of issuing a digital certificate from a certificate authority to a vendor. The certificate authority may an engine manufacturer. The vendor may be an outside supplier tasked with providing an electronic component for installation in an engine produced by the engine manufacturer.

At block 202, a vendor processing system (e.g., server) and a certificate authority processing system (e.g., server) may be in an asymmetrically encrypted session. At block 204, the certificate authority processing system may generate a digital certificate for the vendor including public and private keys for the vendor. At block 206, the certificate authority processing system may determine whether the digital certificate, public, and private keys are valid. If not, then the certificate authority processing system may return to block 204. If valid at block 206, then the certificate authority processing system may transmit the digital certificate, public, and private keys to the vendor processing system. The vendor processing system may install the digital certificate, public, and private keys on a component configured to communicate over an electronic network in, for example, an engine produced by the engine manufacturer.

Figure 2B:
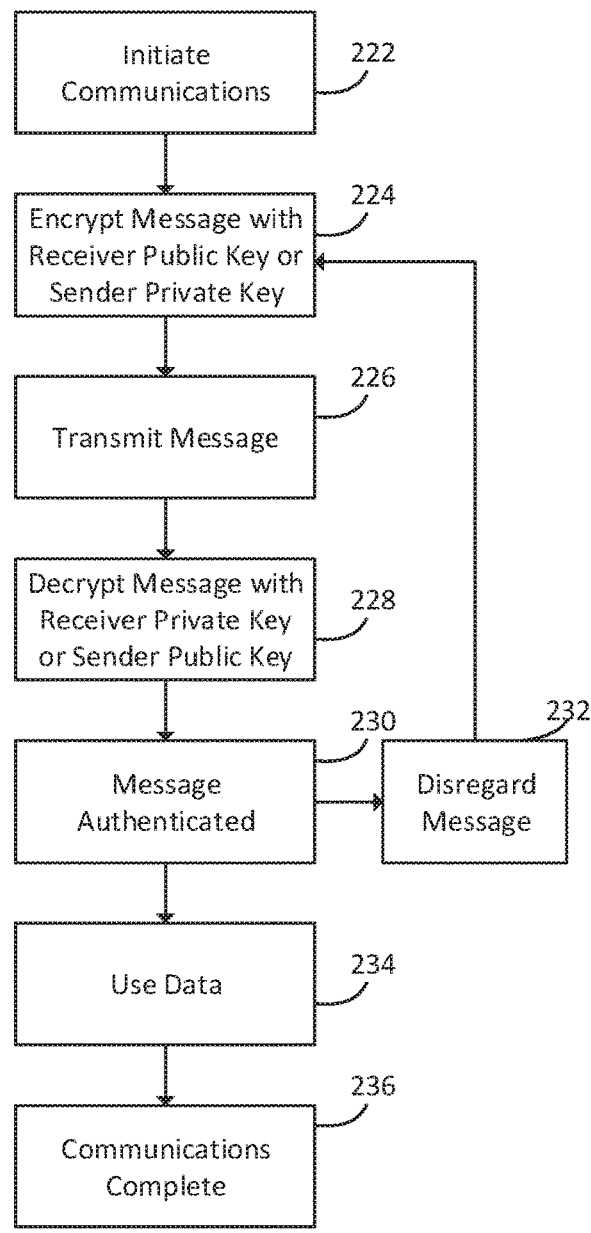
FIG. 2B is an exemplary method of using a digital certificate during a communication session between a sender and a receiver.

FIG. 2B presents a method of communication between a sender and a receiver over a network (e.g., a processing system of an aircraft engine). Both the sender and receiver may be a central control module 130. One of the sender and receiver may be a central control module 130 and the other of the sender and receiver may be a smart sensor 110 or a smart actuator 120.

Prior to the method of FIG. 2B, the sender may possess a digital certificate, public, and private keys issued according to the method of FIG. 2A (e.g., issued from a certification authority). The receiver may be configured to recognize and authenticate a digital certificate issued by the certification authority. The receiver may similarly possess separate digital certificate, public, and private keys issued by the certification authority during the method of FIG. 2A. Exemplary features of digital certificates are discussed below.

At block 222, the sender may initiate communications with the receiver. At block 224, the sender may encrypt a message to the receiver with a public key of the receiver or a private key of the sender. At block 226, the sender may transmit the message to the receiver. At block 228, the receiver may decrypt the message with the private key of the receiver or the public key of the sender. At block 230, the receiver may determine whether the message is authenticated based on the message decryption.

If not authenticated, then the receiver may disregard the message at block 232 and the method may return to block 224. If authentic, then the receiver may execute a control based on data contained in the message at block 234. For example, if the sender is a smart sensor 110 then the receiver may accept sensor measurements contained in the message as accurate readings at block 234. If the sender is a central control module 130 and the receiver is a smart actuator 120, then the receiver may perform an activity contained in the message (e.g., increase or decreasing rotational speed). At block 236, the communication session between the sender and receiver can end.

Figure 3:
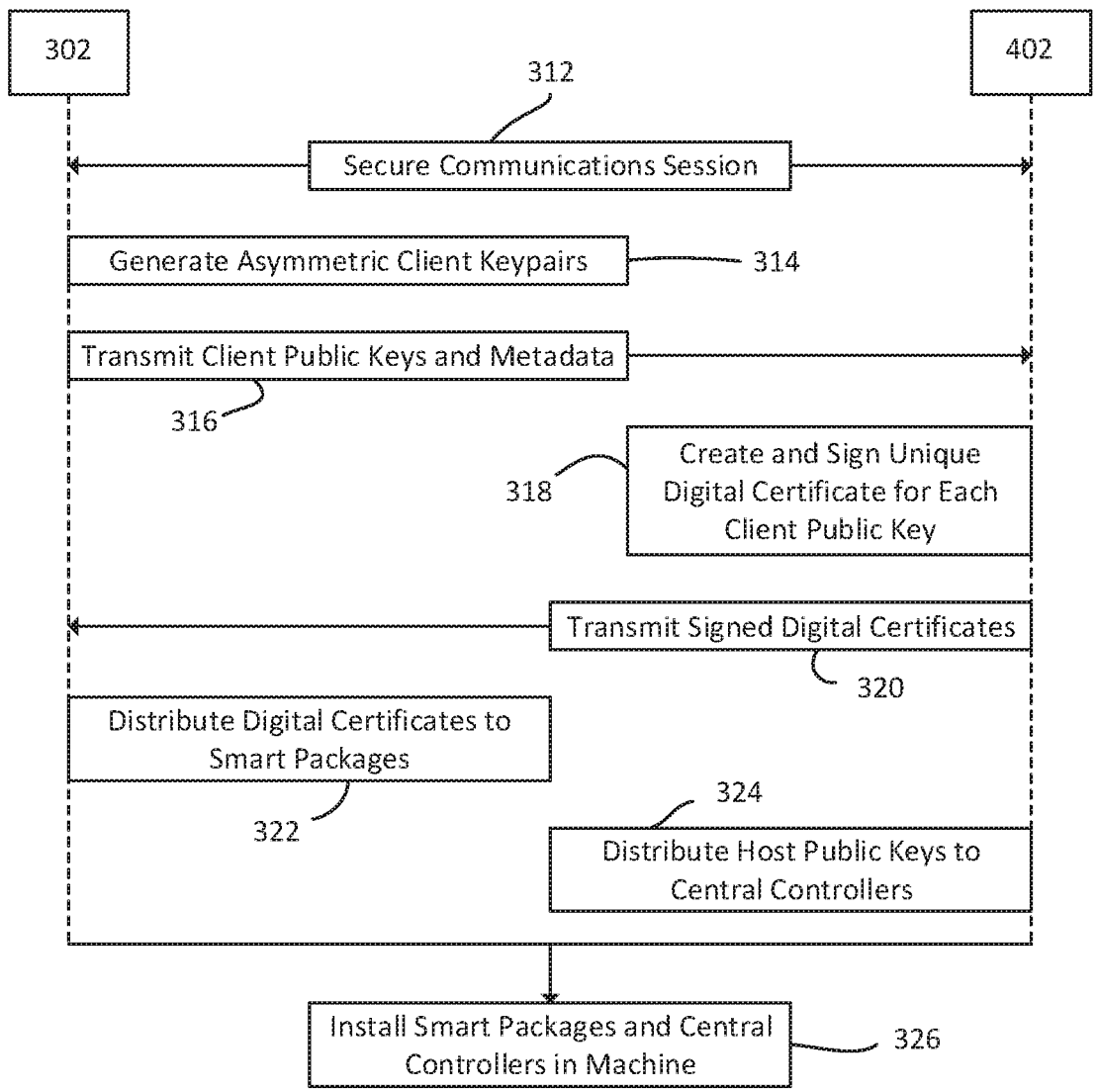
FIG. 3 is an exemplary method of issuing a digital certificate from a host to a client.

FIG. 3 presents a method of provisioning digital certificates from a first host 402 to a first client 302. Both first host 402 and first client 302 may be processing systems comprising at least one processor and memory. For example, first host 402 may be a general purpose computer and the client may be a smart package, such as a smart sensor or a smart transducer.

First host 402 can function as a certificate authority and be a server controlled by an engine manufacturer. First client 302 can be a server controlled by a vendor, which is configured to program smart packages (e.g., upload software onto smart packages). As another example, both first host 402 and first client 302 can have been installed in a vehicle (e.g., aircraft) prior to the method of FIG. 3.

At block 312, first client 302 may be in a secure communication session with first host 402 over a network such as the Internet. First host 402 may store one or more host asymmetric key pairs each including a host public key and a host private key. First client 302 may be a server located in a smart package manufacturing facility.

At block 314, first client 302 may generate a plurality of client asymmetric key pairs each including a client public key and a client private key. At block 316, first client 302 may transmit a message to first host 402. The message may include the plurality of client public keys each paired with a digital certificate request. Each digital certificate request may include metadata such as intended smart package model and/or intended smart package serial number.

At block 318, first host 402 may create a unique digital certificate for each client public key. During block 318, first host 402 may reject any duplicate client public keys from first client 302, such that every client public key must be unique. Each digital certificate may be signed with the same host private key. Alternatively, each digital certificate may be signed with a host private key selected based on the metadata (e.g., intended smart package model and/or serial number) paired with each client public key.

For example, first host 402 may sign each digital certificate destined for a temperature sensor with a first host private key, each client public key destined for a rotational speed sensor with a second host private key, etc. As another example, first host 402 may sign each digital certificate destined for a first engine model with a first host private key and each digital certificate destined for a second engine model with a second host private key. As a further example, first host 402 may sign each digital certificate destined for a first engine model and a first serial number with a first host private key and each digital certificate destined for the same engine model and a second serial number with a second host private key. According to this example, each smart package in an engine (upon installation) may be signed with the same unique private key. Exemplary elements of a digital certificate are further discussed below.

At block 320, first host 402 may transmit the signed digital certificates to first client 302. At block 322, first client 302 may distribute the signed digital certificates to smart packages. Each smart package may receive a signed digital certificate, the associated client private key, and the associated client public key. Therefore, each smart package may receive a unique digital certificate, a unique private key, and a unique public key. First client 302 may distribute the signed digital certificates based on metadata in the digital certificates and based on the model/serial numbers of the smart packages. According to some embodiments, the digital certificate, private key, and public key are flashed into flash memory (e.g., EPROM, NAND) disposed within security processor 116, 126.

At block 324, the one or more host public and/or host private keys may be stored on a central control module of a vehicle processing system. For example, each host private key (and/or each host public key coupled to each host private key) used to sign a digital certificate of a smart package integrated into a processing system may be stored on the processing system. According to some embodiments, the coupled host public keys, but not the host private keys are loaded onto the processing system (e.g., the electronic engine control system). As used herein, public and private keys from the same keypair are "coupled".

In one illustrative example, there are twenty-six host key pairs (host key pairs A-Z respectively including host private keys A-Z and host public keys A-Z). A first engine control system (i.e., processing system) includes smart packages signed with host private keys A, B, and C. Therefore, coupled host public keys A, B, and C may be loaded onto the first engine control system. A second engine control system includes smart packages signed with host private keys B, C, and D. Therefore, coupled host public keys B, C, and D may be loaded onto the second engine control system.

Furthermore, the substantive mappings between client public keys and each host public key may be loaded onto the processing system. The mappings may be based on how host key pairs were selected during block 318. For example, if each smart temperature sensor was signed with host private key A, then host public key A may map to temperature sensors. As another example, if host private key B was used to sign digital certificates for client public keys 1-10, then host public key B may map to client public keys 1-10. Put differently, the processing system may store the signing methodology applied during block 318 such that each coupled host public key maps to a predetermined subset of clients.

The processing system may be configured to validate (i.e., trust) digital certificates signed with the host private keys coupled to the stored host public keys. Therefore, the first engine control system may be configured to trust messages including a digital certificate signed with host private key A, B, or C while the second engine control system may be configured to trust messages including a digital certificate signed with host private key B, C, or D. As further discussed below, a processing system may be configured to establish whether a digital certificate was signed with a private key using only the coupled public key and without ever learning the private key. Therefore, the first engine control system may be configured to determine whether a digital certificate was signed by host private key A, B, or C by using coupled host public keys A, B, and C.

Figure 5:
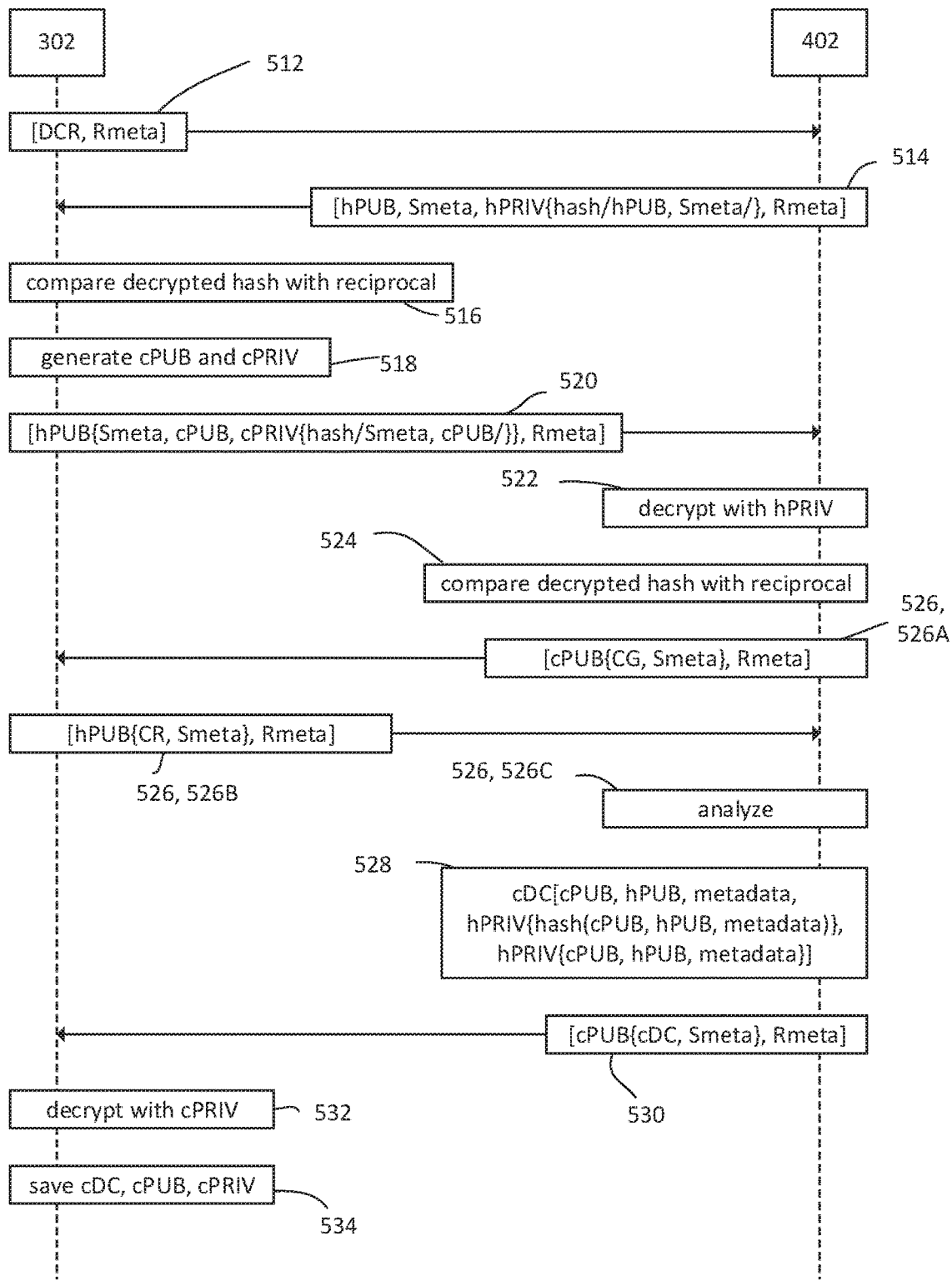
FIG. 5 is an exemplary method of issuing a digital certificate from a host to a client.

The host private key may also be embedded into the OS or AS of the control system that is loaded during a secure boot sequence. An example of this is shown in FIG. 5 of co-pending application Ser. No. 16/283,644, the entirety of which is incorporated by reference.

Understanding the configuration and validity of the embedded software that is loaded into the system is one way to mitigate malicious code from entering into the control system. Several of the key items for a secure network are that the system must have levels of protection against intrusion, the ability to detect an intrusion, the ability to recover and adapt after an intrusion occurs and the ability to be updated for future threats. These capabilities are enablers for cyber secure computer or embedded control systems. One method described herein is to ensure the control system is protected by integration of a cyber-secure, Blockchain signature into the software image that can be tested and validated before the software is loaded into the system.

In addition to the need to configuration control and validation of the software that has been loaded into the system, there are also cybersecurity components that needs to be addressed during the startup sequence. Integration of a Blockchain icon or image can securely define the OS and AS source code configuration and version, and can validate if it has been modified since its installation.

This embodiment is focused on several methods that can be implemented to establish a cyber secure bootup sequence via comparisons of integral Blockchain images in either the embedded OS or AS blocks of executable code. During the power-up and software launching sequences, the system does an integrity check by comparing a hash of the current code with the hash that is stored in a secure hardware device. The flow diagram in FIG. 5 of application Ser. No. 16/283,644 shows this additional approach.

Returning to FIG. 3, at block 326, the smart packages and the central control modules may be installed in a gas turbine of an aircraft. The smart packages and the central control modules may define at least a portion of an engine processing system. The smart packages may be configured to apply the digital certificates when digitally communicating within the processing system (e.g., when communicating with the central control modules), as discussed below with reference to FIG. 4.

Figure 4:
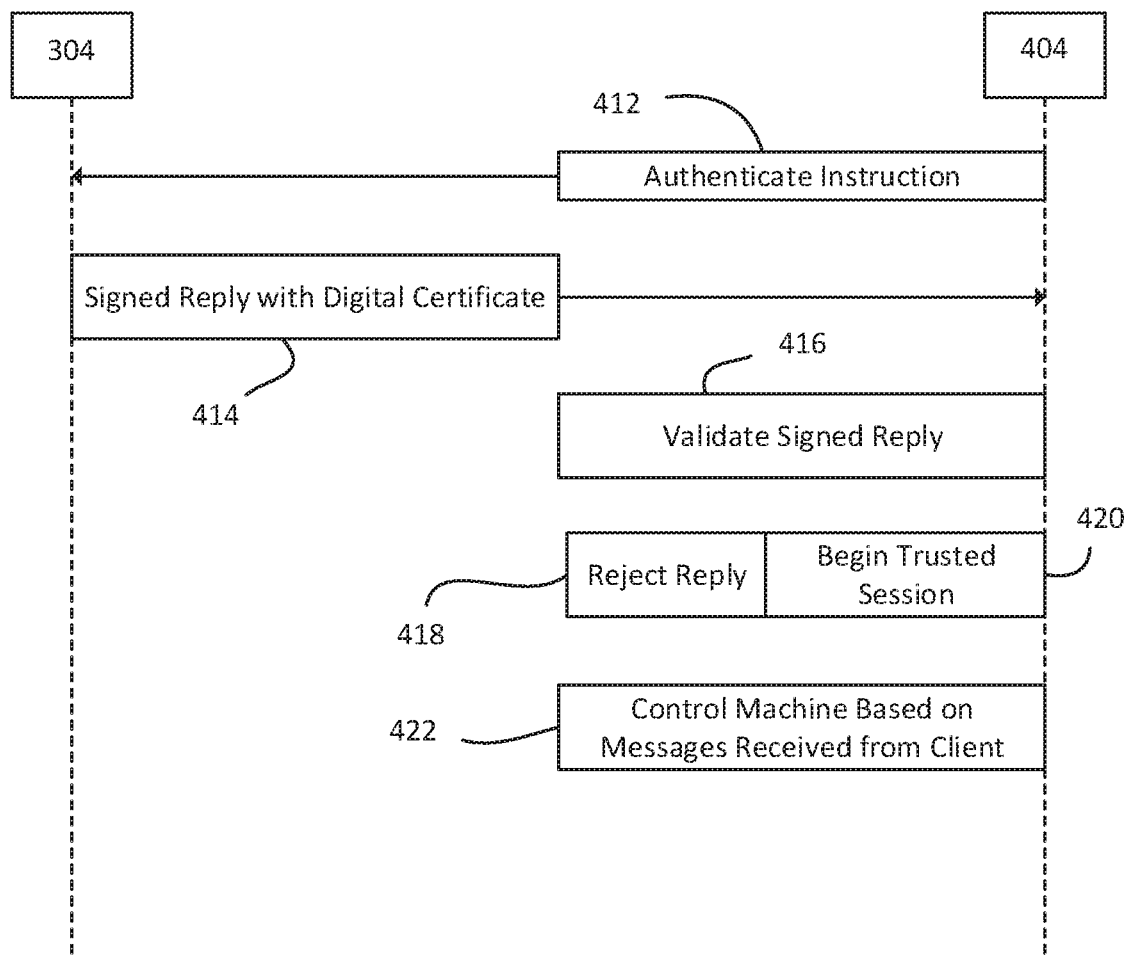
FIG. 4 is an exemplary method of using a digital certificate in communications between a client and a host.

FIG. 4 presents a method of using signed digital certificates to authenticate communications. During the method of FIG. 4, a second client 304 (e.g., a smart package) may present the digital certificate to other module(s) (called a second host 404) disposed in a certain processing system (e.g., one or more central control modules). After authenticating the second client, the second host may join a trusted encrypted communications session with the second client.

Second client 304 may be a different component than first client 302. Second client 304 may be the same component as first client 302. Therefore, the method FIG. 4 can represent a method of using a digital certificate issued during the method of FIG. 3. Second host 404 may be the same component as first host 402. Alternatively, second host 404 may be a different component than first host 402. According to one illustrative example, second client 304 may be a smart sensor and second host 404 may be a central control module. According to another illustrative example, second client 304 may be a central control module and second host 404 may be a smart transducer.

At block 412, second host 404 may instruct second client (e.g., the smart package) 402 to authenticate. Second host 404 may issue the instruction based on, for example, receiving a start command (e.g., an engine start command). At block 414, second client 304 may reply to the second host 404 with a message. The message may be signed with the client private key of the second client. The message may include a digital certificate previously issued to the second client authenticating the digital signature of the second client.

At block 416, second host 404 may determine (a) whether the digital signature of the second client is authentic according to the digital certificate and (b) whether the digital certificate was signed with a trusted host private key (e.g., whether the digital certificate was signed with a host private key corresponding to one of the host public keys loaded onto second host 404 during block 326).

If second host 404 determines that both (a) and (b) of block 416 are valid, then second host 404 may proceed to block 420. If second host 404 determines that one or both of (a) and (b) are invalid, then second host 404 may proceed to block 418, where second host 404 may reject the message, issue a warning signal, etc.

At block 420, second host 404 may begin a trusted communications session with the (now authenticated) second client. During the trusted communication session (block 422), second host 404 may control a machine based on messages reported from a smart package. For example, second host 404 may control fuel flow rate to a gas turbine engine based on messages reported from a smart package. As discussed below, the second host may accept and reject data from the second client based on a privilege level assigned to the second client.

FIG. 5 presents an exemplary method of issuing a digital certificate to first client 302 from first host 402. The method of FIG. 5 may represent an example implementation of the method of FIG. 3. Any features discussed with reference to FIG. 5 may be applied during the method of FIG. 3 and vice-versa.

Figure 6:
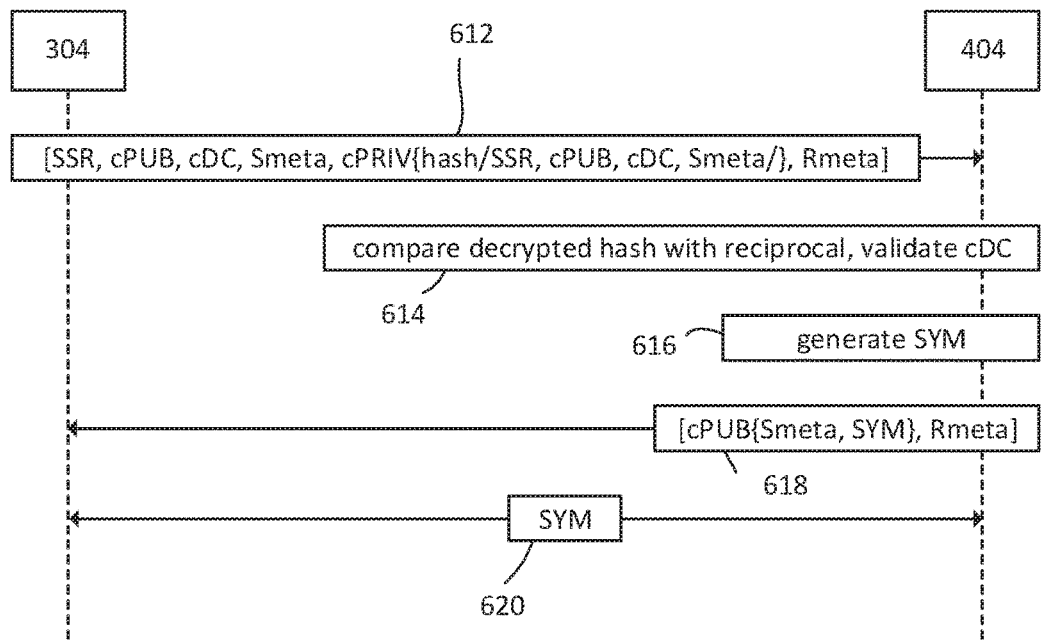
FIG. 6 is an exemplary method of issuing a digital certificate from a host to a client.

FIG. 6 presents an exemplary method using signed digital certificates to authenticate communications between second client 304 and second host 404. The method of FIG. 6 may represent an example implementation of the method of FIG. 4. Any features discussed with reference to FIG. 6 may be applied during the method of FIG. 4 and vice-versa.

The discussion of FIGS. 5 and 6 refers to a first client 302, a second client 304, a first host 402, and a second host 404.

The clients and hosts can be any electronic components discussed herein. According to some illustrative examples, first client 302 may be a server located at a vendor configured to transfer information onto second client 304, which may be a smart package or a central control module. First host 402 may be a certificate authority, such as a server operated by an engine manufacturer or a central control module in an aircraft processing system. Second host 404 may be a different central control module in an aircraft processing system. Second host 404 may be a smart actuator.

With respect to FIGS. 5 and 6, curly brackets "{ }" indicate encryption while right-angled brackets "[ ]" indicate inclusion. Therefore, A{X, Y, Z} means that data elements X, Y, Z are each encrypted based on key A. Multiple levels of encryption may be applied to a message. B{A{X, Y, Z}} means that data elements X, Y, Z are each encrypted based on key A, then the result is re-encrypted based on key B. A[B{X, Y}, C] means that A includes X, Y, and C where X and Y are encrypted based on key B, while C is not encrypted based on key B.

The term hash followed by pair of slashes "hash//" indicates hashing. Therefore, hash/A, B, C/ means that data elements A, B, and C are hashed together. "PUB" and "PRIV" respectively mean public and private. "c" and "h" respectively mean client and host. "Rmeta" means routing metadata. "Smeta" means security metadata, which may include a timestamp, an arbitrary nonce, and if applicable, the applied hashing formula to enable reciprocal hashing.

Referring to FIG. 5, first client 302 may transmit a digital certificate request (DCR) to first host 402 at block 512. At block 514, first host may reply to the DCR with (a) a host public key hPUB, (b) security metadata (SMeta), (c) a hash of (a) and (b) encrypted with a host private key (hPRIV), and (d) routing metadata (RMeta). The combination of (a), (b), and (c) may represent a digital signature.

A digital signature, as used in the present application, may include an unencrypted public key (e.g., hPUB), unencrypted message content (e.g., SMeta), and a hash of the unencrypted public key and message content encrypted with the private key (e.g., hPRIV) associated with the unencrypted public key At block 516, first client 302 may produce a reciprocal hash and decrypt the encrypted hash. First client 302 may rely on instructions in Smeta to produce the reciprocal hash (i.e., Smeta, once decrypted, may reveal the exact hashing formula applied to generate the original hash, including which elements were incorporated into the hash). If the reciprocal hash matches the decrypted hash and hPUB is on a prestored list of valid host keys, then first client 302 may advance to block 518. The predetermined list of valid host keys may be installed on read-only-memory. If first client 302 is a smart sensor/actuator 110/120, then the read-only-memory may be integrated in security processor 116, 126. As with all features disclosed herein, block 516 is optional.

At block 518, first client 302 may use a randomized seed to generate a client public key (cPUB) and a client private key (cPRIV). At block 520, first client 302 may transmit a message to first host 402 including (a) Smeta, (b) cPUB, (c) a hash of (a) and (b) encrypted with cPRIV, and (d) routing metadata (RMeta). Each of (a), (b), and (c) may be encrypted with hPUB.

At block 522, first host 402 may decrypt the message with hPRIV. At block 524, first host 402 produce a reciprocal hash (as discussed above, the reciprocal hash may be produced by following a formula contained in Smeta). If the decrypted hash matches the reciprocal hash, then first host 402 may advance to block 524. Otherwise, first host 402 may end the session with first client 302.

At block 526, first host 402 may authenticate (also called validate) first client 302. Block 526 may include a plurality of communications 526A-526C between first host 402 and first client 302. Block 526 is further discussed below. First host 402 may advance to block 528 if first client 302 is authenticated during block 526. Otherwise, first host 402 may end the session with first client 302.

As discussed above, first host 402 may possess an asymmetric keypair including a host public key (hPUB) and a host private key (hPRIV). At block 528, first host 402 may produce a digital certificate for first client 302. The digital certificate (cDC) may include (a) an unencrypted copy of cPUB, (b) an unencrypted copy of hPUB, (c) other unencrypted certificate metadata, (d) a hash of (a), (b), and (c) encrypted with hPRIV, and/or (e) copies of (a), (b), and (c) encrypted with hPRIV.

At block 530, first host 402 may transmit the cDC to first client 302. Within the message, the cDC may be encrypted with cPUB. At block 532, first client 302 may use cPRIV to decrypt the cDC. At block 534, first client 302 may save the cDC with the cPUB and the cPRIV. As discussed below, first client 302 may use the cDC to establish a trusted communication session with second host 404. In some embodiments, first client 302 may append the cDC to each communication sent to first host 402.

First host 402 may repeat the process of FIG. 5 by issuing a different digital certificate to each of a plurality of clients. Each client may have a unique cPUB and cPRIV, while first host 402 may use a constant hPUB and hPRIV. Alternatively, first host 402 may select a host asymmetric keypair from a plurality of options based on data contained in the DCR. Data contained in the DCR may include, for example, model number and/or serial number of first client 302. First host 402 may select a certain host asymmetric keypair for use during the method of FIG. 5 based on the model and/or serial number of first client 302.

To authenticate first client 302 at block 526, first host 402 may require first client 302 to satisfy one or more challenges. Referring to FIG. 5, first host 402 may issue one or more challenges (CG) at block 526A. First client 302 may provide one or more challenge responses (CR) at block 526B. First host 402 may evaluate the challenge responses at block 526C to determine whether the challenges have been satisfied. According to some embodiments, each of the below challenges must be satisfied. According to other embodiments, only one, two, or three of the below three challenges must be satisfied (i.e., the responses to the challenges must be acceptable). The below challenges are only illustrative examples.

First challenge: The challenge (CG) in block 526A may include an instruction for first client 302 to hash an internally stored dataset (e.g., software code such as firmware, a part number, a serial number, and/or a date of manufacture). At block 526B, first client 302 may provide the hash to first host 402. At block 526C, first host 402 may perform a reciprocal hash on copy of the same dataset stored on first host 402. If the reciprocal hash matches the client hash, then first host 402 may accept the challenge response.

Second challenge: At block 526C, first host 402 may calculate a time difference (i.e., latency) between (a) issuing the CG to first client 302 at block 526A and (b) receiving the challenge response from client 302 at block 526B. If the time difference is less than a maximum predetermined value and more than a minimum predetermined value, then first host 402 may accept the challenge response. First host 402 may calculate the maximum predetermined value based on (a) the complexity of the challenge issued at block 526A (e.g., the quantity of data to be hashed) and (b) a previously measured ping value for first client 302.

Third challenge: The challenge (CG) at block 526A may include an instruction for first client 302 to provide a particular measurement (e.g., flow rate, pressure, rotational speed, temperature) or to produce a certain physical effect (e.g., drive a shaft at a particular speed, open/close a valve; transmit data at a particular frequency). At block 526B, first client 302 may provide the measurement or produce the action.

At block 526C, first host 402 may determine whether first client 302 provided an accurate measurement and/or performed the requested action. For example, first host 402 may query other smart sensors 110 to determine whether first client 302 provided a correct measurement/produced the required action (other smart sensors 110 are configured to report a related physical metric). Put differently, first host 402 may query other smart sensors 110 to determine whether the data provided by the other smart sensors 110 is consistent with the challenge instruction of block 526A. If first host 402 determines that first client 302 provided accurate data/produced the desired action, then host 402 may accept the challenge response.

FIG. 6 presents a method of initiating a trusted secure communication session between second client 304 and a second host 404. As stated above, first client 302 may be a smart sensor/actuator 110/120 and second host 404 may be a central control module 130 or vice-versa. Prior to the method of FIG. 6, second client 304 may have performed the method of FIG. 3/5. Therefore, second client 304 may be in possession of the client digital certificate cDC, signed by first host 402.

At block 612, second client 304 may send a message to second host 404. The message may include (a) an unencrypted secure session request (SSR), (b) an unencrypted copy of cPUB, (c) an unencrypted copy of the cDC, (d) Smeta and (e) a hash of (a), (b), and (c) encrypted with cPRIV.

At block 614, second host 404 may decrypt the hash with cPUB, then perform a reciprocal hash. Exemplary methods to perform a reciprocal hash are discussed above. Second host 404 may confirm that the cDC is valid (as described below). If the cDC is valid and the hash matches the reciprocal hash, then second host 404 may advance to block 616. Otherwise, second host 404 may reject the message from second client 304 and instruct second client 304 to obtain a new cDC (e.g., re-perform the method of FIG. 3).

Second host 404 may perform the following process to validate the cDC at block 614. First, second host 404 may generate a reciprocal hash of cPUB, hPUB, and the certificate metadata. Next, second host 404 may use hPUB to decrypt the encrypted hash of cPUB, hPUB, and the metadata. If the reciprocal hash matches the decrypted hash, then second host 404 may determine whether hPUB is stored on a predetermined list of valid signatories and whether cPUB is mapped with hPUB. If hPUB is on the list and cPUB is mapped with hPUB, then second host 404 may find that the cDC to be valid (assuming other conditions are met (e.g., cDC has not expired according to the metadata)).

As previously discussed with reference to block 324 of FIG. 3, each hPUB stored as "valid" on second host 404 may map to a limited group of clients. For example, if host private key A was used to sign the client digital certificate of client serial numbers 1-10, then host public key A may map to client serial numbers 1-10.

During block 614, second host 404 may ensure that the cPUB of second client 404 maps to the hPUB of the digital certificate of second client 404. Maps between hPUBs and cPUBs/clients may be prestored on second host 404. Each map may be a list of every cPUB that was signed with the hPRIV corresponding to a valid hPUB. For example, hPUBs A, B, and C are stored as valid on second host 404. Second host 404 may include a first list for hPUB A, a second list for hPUB B, and a third list for hPUB C. The first list may include every cPUB that was signed with hPRIV A, the second list may include every cPUB that was signed with hPRIV B, and the third list may include every cPUB that was signed with hPRIV C.

At block 616, second host 404 may generate a symmetric cryptographic key (SYM) from a randomized seed. According to some embodiments, some properties of the SYM may reflect the privilege level of second client 304. For example, a SYM of a first length may be used for a second client 304 with a low privilege level while a SYM of a second length may be used for a second client 304 with a high privilege level. Privilege levels are further discussed below. At block 618, second host 404 may send a message to second client 304 including the SYM encrypted with cPUB.

At block 620, second client 304 and second host 404 may begin a trusted symmetric-key encrypted session where at least a portion of each message sent during the session is encrypted with the shared SYM. Because the session is trusted, second host 404 may rely on substantive data (e.g., transducer measurements) captured by client 302. For example, if second client 304 is a smart sensor 110 and second host 404 is a central control module 130, then second host 404 may rely on measurements reported by second client 304 when controlling a smart actuator 120. If second client 304 is a central control module 130 and second host 404 is a smart actuator 120, then second host 404 may implement instructions issued by second client 304.

Second host 404 may set a privilege level for second client 304 based on an identifier (e.g., serial number, cPUB, and/or hPUB in the cDC). For example, if the hPUB in the cDC of second client 304 was only used to sign digital certificates of temperature sensors, then second host 404 may limit substantive data accepted from second client 304 to temperature metrics. Second host 404 may reject any data (e.g., flow rate metrics, executable files) from second client 304 outside the scope of the permission level.

Second host 404 may store a privilege level for each valid hPUB and/or cPUB. At a high privilege level, second host 404 may allow a second client 304 to update, on second host 404: the operating system (e.g., the kernel), the firmware, the list of valid hPUBs, the mapping between each valid hPUB and permission level, etc. At a low privilege level, second host 404 may limit second client 304 to feeding substantive data (i.e., data excluding encryption and authentication measures) into a predetermined application.

The technology discussed above with reference to FIGS. 2A, 2B, 3, 4, 5, and 6 may offer multiple different advantages. First, the technology may confirm TRL and MCRL readiness levels. Second, the technology may ensure that smart packages/modules manufactured by external suppliers (i.e., vendors) can communicate over an engine network. Third, the technology may ensure that smart packages/modules can function under an electronic attack. Fourth, the technology may validate part numbers, serial numbers, dates of manufacture, etc. Fifth, the technology may validate component authority for source, function, and configuration. Sixth, the technology may result in reduced maintenance burden and the date of engine installation being captured. Seventh, the technology may provide financial support for maintainability and spares. Eighth, the technology may ensure that original equipment manufacturer and aftermarket components satisfy the original design intent since according to some embodiments, digital certificates must be updated on an annual basis (i.e., the digital certificates have a one-year expiration date). Ninth, the technology may result in a reduced cyber security burden by virtue of the digital certificate, which can be stored in a trusted platform module or a hardware security module.

Referring to FIG. 1, each package/module 110, 120, 130 may include one or more processors, memory, and one or more input/output devices. Processors may include one or more distinct processors, each having one or more cores. Each of the distinct processors may have the same or different structure. Processors may include one or more central processing units (CPUs), one or more graphics processing units (GPUs), circuitry (e.g., application specific integrated circuits (ASICs)), digital security processors (DSPs), and the like. Processors may be mounted on a common substrate or to different substrates.

Processors are configured to perform a certain function, method, or operation at least when one of the one or more of the distinct processors is capable of executing code, stored on memory embodying the function, method, or operation. Processors may be configured to perform any and all functions, methods, and operations disclosed herein.

For example, when the present disclosure states that processing system 100 performs/may perform task "X", such a statement should be understood to disclose that processing system 100 may be configured to perform task "X". Processing system 100 is configured to perform a function, method, or operation at least when processors are configured to do the same.

Memory may include volatile memory, non-volatile memory, and any other medium capable of storing data. Each of the volatile memory, non-volatile memory, and any other type of memory may include multiple different memory devices, located at multiple distinct locations and each having a different structure.

Examples of memory include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that may be used to store program code in the form of instructions or data structures, and the like. Any and all of the methods, functions, and operations described in the present application may be fully embodied in the form of tangible and/or non-transitory machine-readable code saved in memory.

Input-output devices may include any component for trafficking data such as ports, antennas (i.e., transceivers), printed conductive paths, and the like. Input-output devices may enable wired communication via USB®, DisplayPort®, HDMI®, Ethernet, and the like. Input-output devices may enable electronic, optical, magnetic, and holographic, communication with suitable memory. Input-output devices may enable wireless communication via WiFi®, Bluetooth®, cellular (e.g., LTE®, CDMA®, GSM®, WiMax®, NFC®), GPS, and the like. Input-output devices may include wired and/or wireless communication pathways.

At times, the present application uses directional terms (e.g., front, back, top, bottom, left, right, etc.) to give the reader context when viewing the Figures. The claimed inventions, however, are not limited to the orientations shown in the Figures. Any absolute term (e.g., high, low, etc.) may be understood and disclosing a corresponding relative term (e.g., higher, lower, etc.).

The present application discloses illustrative (i.e., example) embodiments. The claimed inventions are not limited to the illustrative embodiments. Therefore, many implementations of the claims will be different than the illustrative embodiments. Various modifications may be made to the claimed inventions without departing from the spirit and scope of the disclosure. The claims are intended to cover implementations with such modifications.

What is claimed is:

1. In a processing system of a gas turbine engine, a method of communicating between a first electronic component and a second electronic component, the method comprising:
  generating by the first electronic component, a request to initiate a trusted communication session with a second electronic component, the request comprising a digital certificate signed with a first host private key, the digital certificate comprising a first host public key and a first client public key, the first host public key indicating that the first electronic component is a predetermined component type which the second electronic component is configured to accept as valid for receipt of a predetermined type of data;
  encrypting at the first electronic component, at least a portion of the request with a first client private key;
  transmitting the request to the second electronic component;
  wherein the first host private key and the first host public key define a first asymmetric keypair and the first client private key and the first client public key define a second asymmetric keypair.

2. The method of claim 1, wherein the portion of the request encrypted with the first client private key comprises a hash of at least the first client public key.

3. The method of claim 2, wherein the hash is of at least the first client public key and the digital certificate.

4. The method of claim 1, wherein the trusted communication session is a symmetric key encrypted digital communication session.

5. The method of claim 1 further comprising:
  establishing at the second electronic component, the trusted communication session with the first electronic component based on authenticating the first electronic component by:
    determining that the digital certificate is valid;
    determining that a latency associated with the first electronic component is less than a predetermined value.

6. The method of claim 5 further comprising:
  generating at the second electronic component, a symmetric key for the trusted communication session;
  encrypting at the second electronic component, the symmetric key with the client public key;
  transmitting the encrypted symmetric key to the first electronic component.

7. The method of claim 6 further comprising controlling by the second electronic component, a fuel valve based on metrics reported by the first electronic component during the trusted communication session.

8. The method of claim 5 further comprising assigning at the second electronic component, a privilege level to the first electronic component based on the first host public key.

9. The method of claim 1 further comprising:
  determining at the second electronic component, whether the digital certificate is authentic by decrypting data within the digital certificate with the first host public key;
  assigning at the second electronic component, a privilege level to the first electronic component based on the digital certificate; and
  rejecting at the second electronic component, data sent from the first electronic component based on the privilege level during the trusted communication session.

10. The method of claim 1, wherein the first electronic component is a smart sensor comprising a transducer.

11. A processing system for controlling a gas turbine engine, the processing system comprising a first electronic component, the first electronic component being configured to:
  generate a request to initiate a trusted communication session with a second electronic component, the request comprising a digital certificate signed with a first host private key, the digital certificate comprising a first host public key and a first client public key, the first host public key indicating that the first electronic component is a predetermined component type which the second electronic component is configured to accept as valid for receipt of a predetermined type of data;
  encrypt at least a portion of the request with a first client private key;
  transmit the request to the second electronic component;
  wherein the first host private key and the first host public key define a first asymmetric keypair and the first client private key and the first client public key define a second asymmetric keypair.

12. The processing system of claim 11, wherein the portion of the request encrypted with the first client private key comprises a hash of at least the first client public key.

13. The processing system of claim 12, wherein the hash is of at least the first client public key and the digital certificate.

14. The processing system of claim 11, wherein the trusted communication session is a symmetric key encrypted digital communication session.

15. The processing system of claim 11 further comprising a second electronic component, which is configured to:
  begin the trusted communication session with the first electronic component based on an authentication of the first electronic component by:
  determining that the digital certificate is valid;
  determining that a latency associated with the first electronic component is less than a predetermined value.

16. The processing system of claim 15, wherein the second electronic component is further configured to:
  generate a symmetric key for the trusted communication session;
  encrypt the symmetric key with the first client public key;
  transmit the encrypted symmetric key to the first electronic component.

17. The processing system of claim 16, wherein the second electronic component is further configured to control a fuel valve based on metrics reported by the first electronic component during the trusted communication session.

18. The processing system of claim 15, wherein the second electronic component is further configured to assign a privilege level to the first electronic component based on the first host public key.

19. The processing system of claim 11 further comprising a second electronic component, which is configured to:

determine whether the digital certificate is authentic by decrypting data within the digital certificate with the first host public key;

assign a privilege level to the first electronic component based on the digital certificate; and during the trusted communication session, reject data sent from the first electronic component based on the privilege level.

20. A method of authenticating data originating from a component supplied by a vendor and received by an engine control module in a gas turbine engine, comprising:

generating operational data in the component, the data indicative of a characteristic associated with the operation of the gas turbine;

encrypting the operational data and a hash with a private key associated with the vendor to create an encrypted message;

transmitting the encrypted message to the engine control module;

receiving the encrypted message at the engine control module;

decrypting the encrypted message, at the engine control module, with a public key associated with the vendor to obtain a decrypted hash, the public key included in a digital certificate received by the engine control module from the component, the public key indicating the component is a predetermined component type from which the engine control module trusts to receive a predetermined type of data;

ensuring the decrypted hash matches a stored hash in the engine control module to thereby authenticate the operational data;

wherein the public key and private key are an asymmetric key pair and the component is a sensor or actuator located on the gas turbine engine.

21. The method of claim 20, further comprising:

generating the asymmetric key pair at a certification authority, and supplying, by the certification authority, the private key to the vendor and the public key to the engine control module.

* * * * *